United States Patent
Jurrens et al.

[19]

[11] Patent Number: 6,003,628
[45] Date of Patent: Dec. 21, 1999

[54] MOTORCYCLE AIR-BAG SUSPENSION SYSTEM

[76] Inventors: Jesse A. Jurrens, 4226 11th NW., Watertown, S. Dak. 57201; Jeffrey J. Kelderman, 2686 Highway 92E, Oskaloosa, Iowa 52577

[21] Appl. No.: 08/906,112

[22] Filed: Jul. 25, 1997

[51] Int. Cl.$^6$ .................................................... B62D 61/02
[52] U.S. Cl. .......................................... 180/227; 280/284
[58] Field of Search .................................. 180/219, 227, 180/358; 280/283, 284, 285, 124.177

[56] References Cited

U.S. PATENT DOCUMENTS

| | | | |
|---|---|---|---|
| 5,098,114 | 3/1992 | Jones | 280/284 |
| 5,348,112 | 9/1994 | Vaillancourt | 180/227 |
| 5,469,930 | 11/1995 | Wiers . | |
| 5,487,443 | 1/1996 | Thurm . | |
| 5,533,586 | 7/1996 | Thompson | 180/227 |
| 5,664,649 | 9/1997 | Thompson et al. | 180/227 |

FOREIGN PATENT DOCUMENTS

| | | | |
|---|---|---|---|
| 1-172093 | 7/1989 | Japan | 180/227 |

OTHER PUBLICATIONS

Custom Chrome, Inc.; Custom Chrome World's Finest Products For Harley Davidsons; 1996; pp. 982 and 983.

*Primary Examiner*—Lanna Mai
*Assistant Examiner*—William R. Zimmerli
*Attorney, Agent, or Firm*—Hugh D. Jaeger

[57] ABSTRACT

A suspension system for a motorcycle including a motorcycle main frame, a wing arm pivotally mounted to the motorcycle main frame about a pivot axis, and an air-bag suspension unit. The air-bag suspension unit includes at least one air bag constructed of an elastomeric material. The air pressure in the airbags in adjustable on the move by the use of pressure regulator operably connected to a small compressor mounted on the motorcycle. The air bag is housed within a slidable housing and is mounted at one end to the slidable housing and at its other end to mounting brackets on the motorcycle main frame. The housing is attached at its front end to the motorcycle main frame and at its back end to the swing arm. The housing also includes slide rods fixed to its forward end which slide within a pair of bushings. An alternate embodiment incorporates a conventional shock absorber along with the air bogs to improve the handling of the motorcycle on rough or uneven terrain.

20 Claims, 8 Drawing Sheets

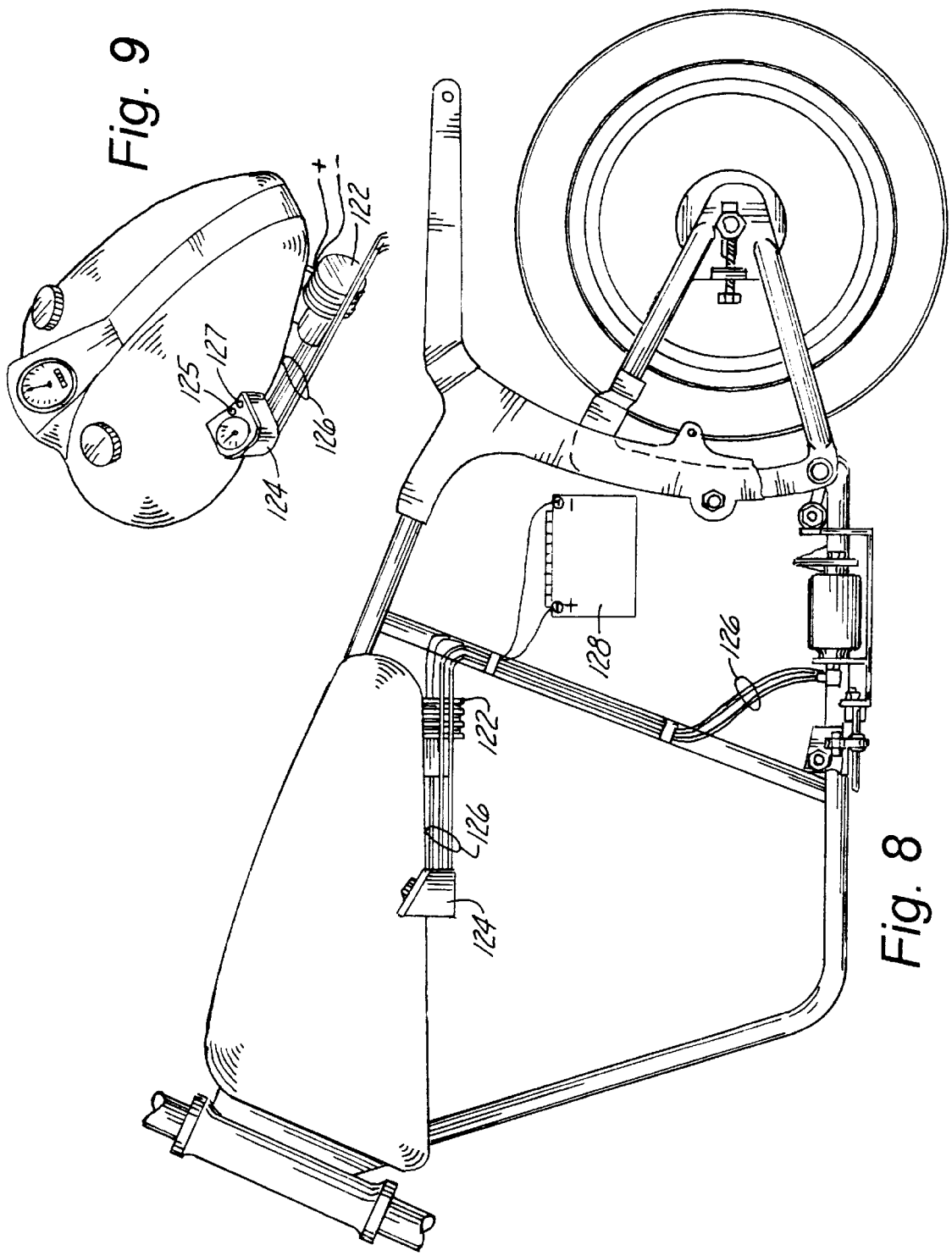

MOTORCYCLE AIR-BAG SUSPENSION SYSTEM

CROSS-REFERENCE TO RELATED APPLICATIONS

Not applicable.

STATEMENT REGARDING FEDERALLY SPONSORED RESEARCH OR DEVELOPMENT

Not applicable.

MICROFICHE APPENDIX

Not applicable.

BACKGROUND OF THE INVENTION

1. Field of the Invention

This invention relates generally to motorcycles, and more particularly to motorcycle suspension systems.

2. Description of the Prior Art

Harley-Davidson is a well known motorcycle manufacturer that manufactures a popular suspension system for its motorcycles under the trademark SOFTAIL. The SOFTAIL® suspension has no visible suspension components and thus mimics the desirable appearance of the Harley-Davidson "hard tail" frame in which the connecting arms of the rear wheel are rigidly fixed to the frame. The SOFTAIL® suspension system incorporates a swing arm and shock absorbers which dampens the effect of the rear wheel attachment, thereby affording an advantage over the "hard tail" frame by providing some suspension cushioning that improves the handling and riding comfort of the motorcycle.

In the SOFTAIL® suspension system, the swing arm pivotally attaches to the struts of the motorcycle main frame, thus enabling the rear wheel to arcuately move independently of the frame. The swing arm includes a pair of wheel mounts located on a wheel axis spaced to receive the rear wheel. A pair of arms extending from each of the wheel mounts includes a connector connecting each pair of arms. Each connector is joined to the other connector by an upper transverse cross member and a lower transverse cross member. An intermediate transverse cross member extends through the connectors and through the frame struts of the motorcycle main frame. The swing arm is pivotal about this intermediate transverse cross member. The connectors have the same general size and shape as the frame struts of the main frame. Each connector is positioned adjacent and inside the corresponding frame struts so they are hidden from view.

The standard or stock SOFTAIL® suspension system uses two shock absorbers mounted in parallel relationship with the motorcycle main frame. One end of each shock absorber is attached to the main frame and the other end is connected to a projection extending forwardly from the lower transverse cross member of the swing arm. The projection is adapted to receive a bolt or pin which connects the shock absorber to the projection. The main frame of the motorcycle hides the projection and shock absorbers from view, thereby retaining the aesthetic appearance of the desirable Harley-Davidson "hard tail" frame.

As mentioned previously, the SOFTAIL® suspension system affords an advantages over the "hard tail" frame by providing some suspension cushioning that improves the handling and riding comfort of the motorcycle. However, as discussed in U.S. Pat. No. 5,487,443 (hereinafter the '443 patent), significant disadvantages remain. For example, the ride remains too harsh and uncomfortable because of the very short travel of the shock absorbers.

As mentioned in the '443 patent, the maximum vertical movement of the rear wheel relative to the main frame is limited to two inches in either vertical direction before the swing arm contacts the main frame. The shock absorbers, have an even smaller maximum travel of 1.5 inches, 0.75 inches in either direction from a center position. The result is that while the rear wheel may travel two inches in one direction from its centered position, the shock absorbers can only travel a distance of 0.75 inches. This limited distance of travel of the shock absorber results in a hard, uncomfortable ride because all of the shock absorption must occur within this narrow range of movement.

Further, the short distance of travel mandates continual and rapid changes of the shock absorber shaft according to the movement of the wheel. Often, these directional changes in the shock absorber cannot occur as fast as necessary to create a smoother ride due to the inherent reluctance of the shock absorber to rapidly change directions. As discussed in the '443 patent, this inherent reluctance to rapid directional change is due to the relatively large momentum forces involved, the inertial drag caused by the movement of the oil or gas within the shock absorber, and the friction resistance caused by the seals and o-rings.

There have been previous attempts to improve the SOFTAIL® suspension system, but these attempts have had little success. For example, it has been attempted to increase the travel distance of the shock absorbers. This solution, however, offers only a modest improvement to the ride of the motorcycle because it does nothing for the responsiveness of the shock absorbers. Additionally, the range of movement of the swing arm is limited by the motorcycle frame, and therefore, the amount of travel of the shock absorber is also limited. Any further increases in the shock absorber travel requires modification to the motorcycle main frame, which is very undesirable. Other attempts have been made to improve the responsiveness of the shock absorbers, however, these attempts are hindered by the drag and friction forces discussed above.

In addition to the problems associated with the ride and handling of the standard or stock SOFTAIL® suspension, many motorcycle enthusiasts attempt to lower the rear of the motorcycle for aesthetic reasons, believing it improves the appearance of the motorcycle. Special kits are sold to allow the frame to be lowered, however, the lower of the rear of the motorcycle reduces the stroke on the suspension as discussed above resulting in a rougher ride.

Therefore, there remains a need for a motorcycle suspension system that maintains the aesthetic appearance of the SOFTAIL® frame while improving the ride and comfort of the motorcycle. There also remains a need for a suspension system that enables the rear of the motorcycle to be raised and lowered when desired for aesthetic purposes.

SUMMARY OF THE INVENTION

A suspension system for a motorcycle, comprising a motorcycle main frame, a swing arm pivotally mounted to the motorcycle main frame about a pivot axis, and an air-bag suspension unit. The swing arm has a pair of wheel mounts located on a wheel axis spaced to receive a wheel. The swing arm further includes a pair of arms extending from each of the wheel mounts and a connector connecting each pair of arms. Each connector is joined to the other connector by an upper transverse cross member and a lower transverse cross member. An intermediate transverse cross member extends along the swing arm pivot axis and through the connectors and is secured to the struts of the motorcycle main frame.

The air-bag suspension unit includes at least one air bag constructed of an elastomeric material. The air bag is housed within a slidable housing and is mounted at one end to the slidable housing and at its other end to mounting brackets on the motorcycle main frame. The housing is attached at its forward end to the motorcycle main frame and is pivotally attached at its rearward to the lower transverse cross member of the swing arm. The housing also includes slide rods fixed to its forward end which slide within a pair of bushings.

In operation, when the rear wheel is caused to move upwardly or downwardly, the swing arm will also move arcuately upwardly or downwardly. The movement of the swing arm will pull or push the air bag housing forwardly or rearwardly as the case may be. If the rear wheel is caused to move upwardly with respect to the main frame, the slidable air bag housing is drawn rearwardly causing the slide bars to slide rearwardly through the bushings. The rearward movement of the air bag housing relative to the stationary transmission mount of the motorcycle main frame causes the air bag therebetween to compress, thus dampening the effect of the movement of the rear wheel. If the rear wheel is caused to move downwardly with respect to the main frame, the air bag housing is pushed forwardly causing the slide bars to slide forwardly through the bushings. The forward movement of the air bag housing relative to the stationary transmission mount of the motorcycle main frame causes the air bag therebetween to stretch thus dampening the effect of the movement of the rear wheel.

In the preferred embodiment, the air pressure in the air-bags is adjustable on the move by the use of a pressure regulator operably connected to a small compressor mounted on the motorcycle. An alternate embodiment incorporates a conventional shock absorber along with the air bags to improve the handling of the motorcycle on rough or uneven terrain.

Therefore, it is an object of the present invention to provide an improved suspension system for a Harley-Davidson SOFTAIL® motorcycle.

It is another object of the present invention to provide an improved suspension system for a Harley Davidson SOFTAIL® motorcycle without having to modify the motorcycle main frame or the swing arm.

It is yet another object of the present invention to provide a way to easily adjust the stiffness of a motorcycle's ride while on the move.

It is still a further object of the present invention to enable the ride height of the motorcycle to be adjustable.

It is still a further object of the present invention to permit the frame of a motorcycle to be lowered when the motorcycle is stopped or when traveling at low speeds for appearance purposes and to be able to quickly raise the frame once again when traveling at faster speeds.

Other objects, advantages, and novel features of the present invention will become apparent from the following detailed description of the invention when considered in conjunction with the accompanying drawings.

BRIEF DESCRIPTION OF THE SEVERAL VIEWS OF THE DRAWINGS

FIG. 8 is a side elevation view of a rear portion of a motorcycle frame showing the airbag suspension system of the present invention;

FIG. 9 is a perspective view of the pressure gage and compressor used for the air-bag suspension system of the present invention;

DETAILED DESCRIPTION OF THE INVENTION

Figure 1:
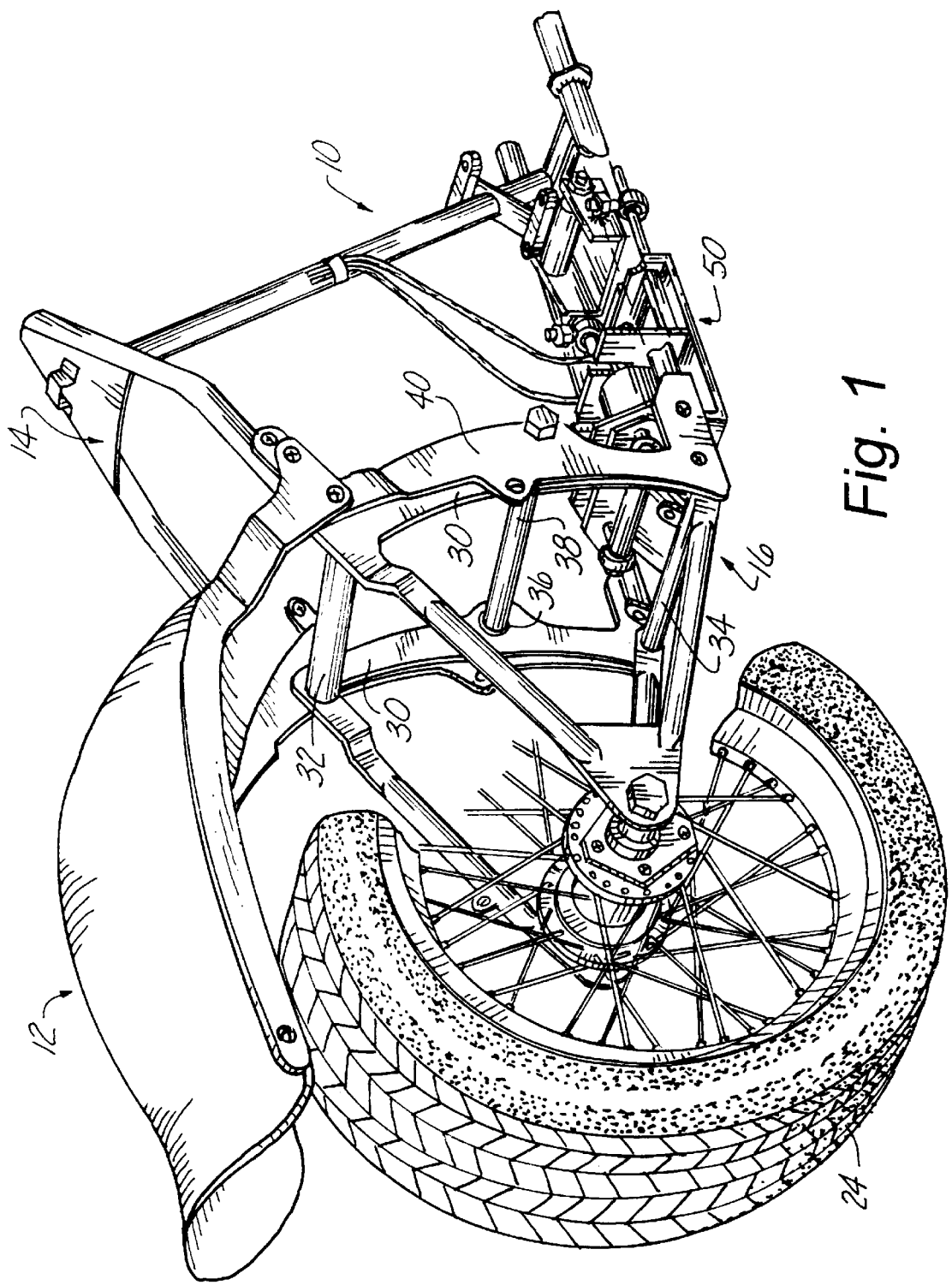
FIG. 1 is a perspective view of a rear portion of a motorcycle showing the air-bag suspension system of the present invention installed on the motorcycle.
Figure 2:
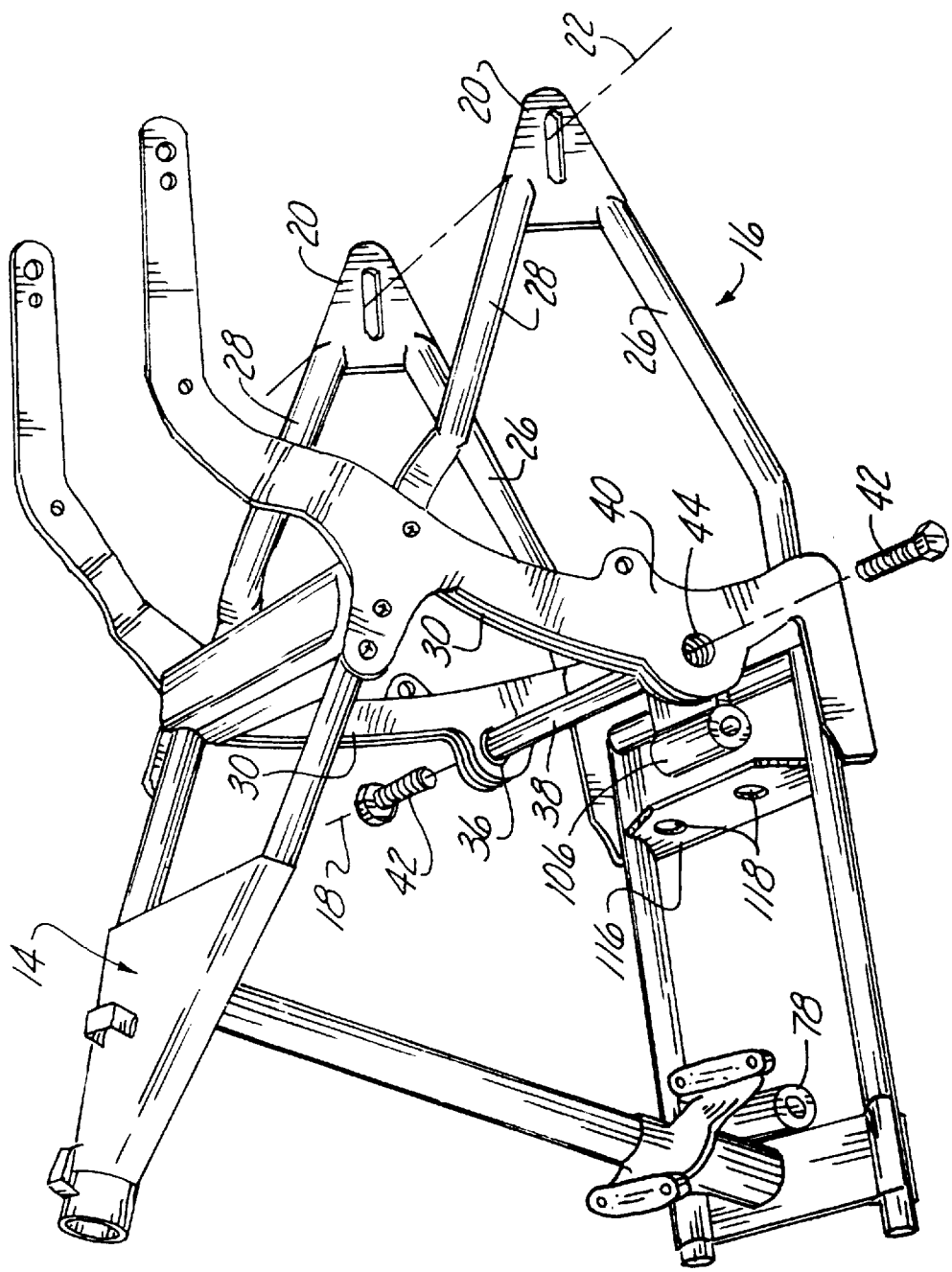
FIG. 2 is a perspective view of a motorcycle main frame and swing arm.

Referring now to the drawings wherein like reference numerals designate identical or corresponding parts throughout the several views, FIG. 1 shows the air-bag suspension system (10) installed on a motorcycle (12). The motorcycle (12) includes a main frame (14) and a swing arm (16) pivotally mounted to the motorcycle main frame (14) on a pivot axis (18) (FIG. 2). The motorcycle main frame (14) and swing arm (16) are symmetrical about the longitudinal axis of the motorcycle (12).

The swing arm (16) includes wheel mounts (20) (FIG. 2) located on the rear wheel axis (22) and are spaced to receive the rear wheel (24) (FIG. 1). The swing arm (16) further includes a pair of arms (26 and 28) extending forwardly from the wheel mounts (20). Connectors (30) (best viewed in FIG. 7) connect each pair of arms (26 and 28). The connectors (30) are joined by an upper transverse cross member (32) and a lower transverse cross member (34). Disposed within the connectors (30) at the pivot axis (18) are sealed bearings (36). An intermediate transverse cross member (38), disposed along the pivot axis (18), and having internal threads (not shown) at each end, extends through these sealed bearings (36) and is secured to the frame struts (40) on the motorcycle main frame (14) by a first set of bolts (42) which are received by apertures (44) in the frame struts (40) and which threadably engage the intermediate transverse cross member (38). The swing arm (16) is thereby pivotal with respect to the motorcycle main frame (14) around the intermediate transverse cross member (38) disposed along the pivot axis (18).

The air-bag suspension system (10) is further comprised of an air bag suspension unit (50) (best viewed in FIG. 3) which includes a slidable housing (52), preferably two air bags (54) disposed therein, a forward connection (56), a rearward connection (58), and a resilient stop member (60). The slidable housing (52) is comprised of a bottom plate (62), to which is attached a front plate (64), a rear plate (66) and an intermediate plate (68). Attached to the front plate (64) are slide rods (70), the purpose of which will be discussed later. Disposed between the front plate (64) and intermediate plate (68) are stiffeners (72). Under some circumstances, an adjustable air type shock absorber might be able to be used instead of the air bags (54).

The forward connection (56) of the air bag suspension unit (50) is comprised of a mounting bracket (74) having apertures (76) therein. The mounting bracket (74) is designed to receive a forward frame mount (78) (FIGS. 2 and 7) projecting from the motorcycle main frame (14). The forward frame mount (78) is adapted to receive a second threaded bolt (80) which extends through the apertures (76) in the forward connection (56) and through the forward mount (78). A nut (82) secures the forward connection (56) to the motorcycle main frame (14).

Figure 3:
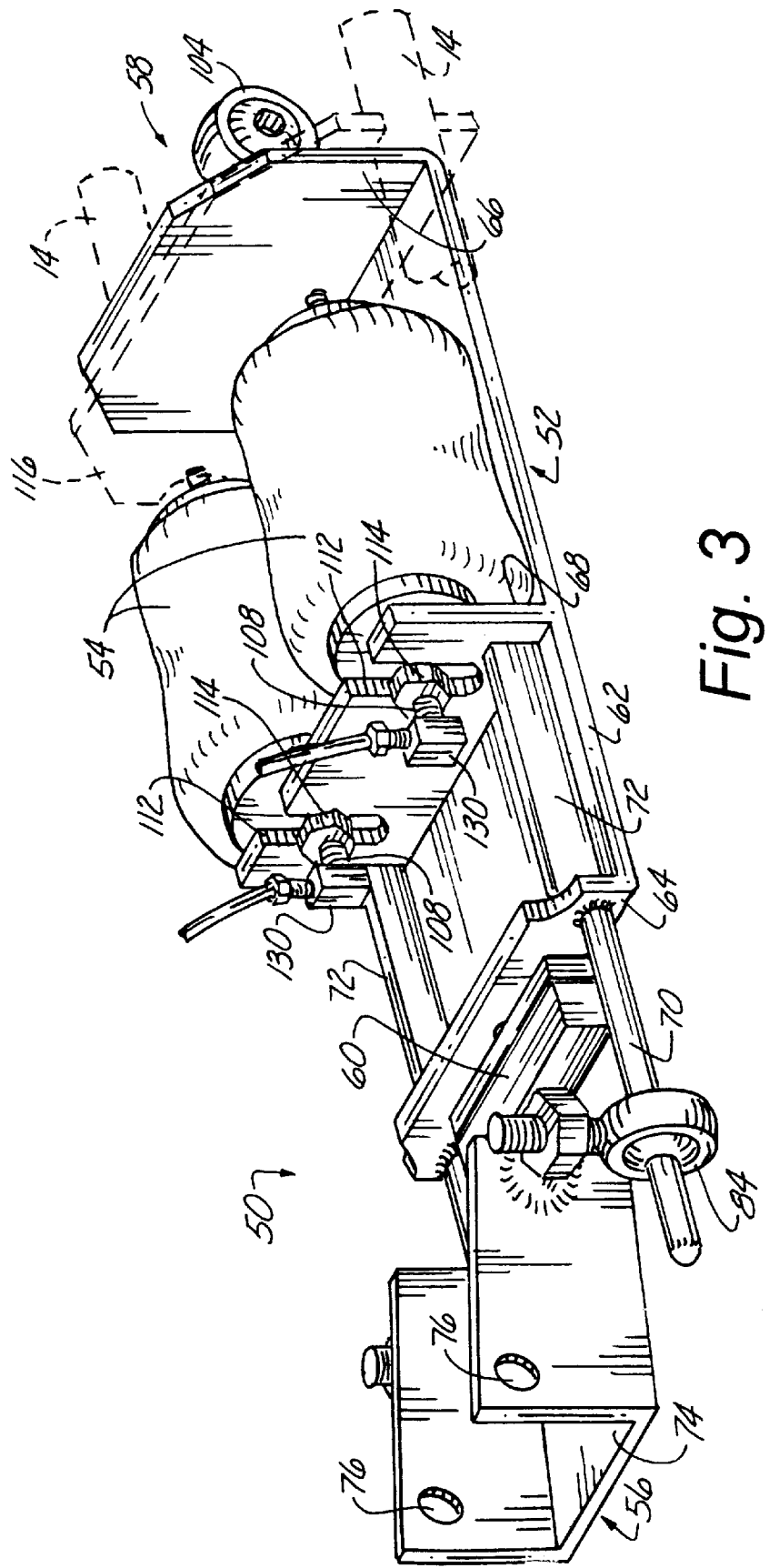
FIG. 3 is a detailed perspective view of the air-bag suspension unit of the present invention.
Figure 4:
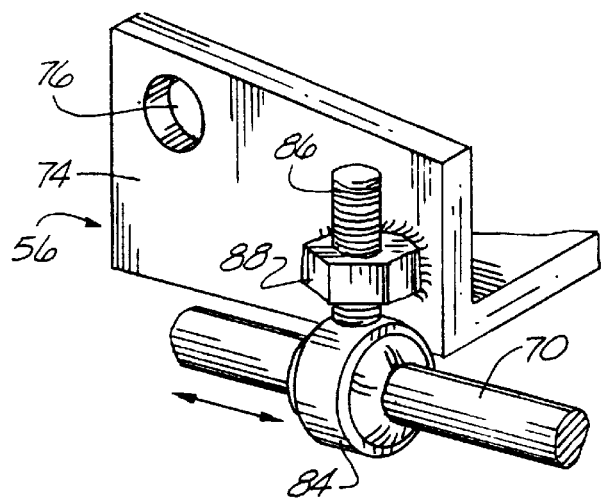
FIG. 4 is a detailed perspective view of the front connection of the air-bag suspension unit of the present invention.

As shown in FIGS. 3 and 4, the forward connection (56) also includes a first pair of bushings (84) which receive the slide rods (70) (the purpose of which will be discussed later). In the preferred embodiment, the bushings (84) include a threaded connector (86) which threadably engages a receiving nut (88) fixed to the mounting bracket (74). The threaded connection enables the bushing (84) to be adjusted so that the slide rods (70) are substantially parallel with the bottom of the motorcycle main frame (14).

Figure 5:
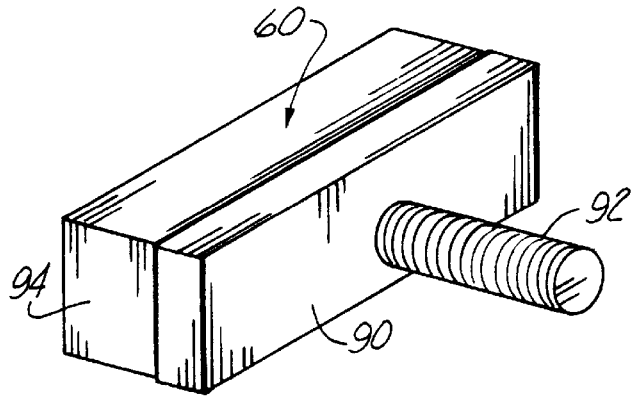
FIG. 5 is a perspective view of the stop member.
Figure 7:
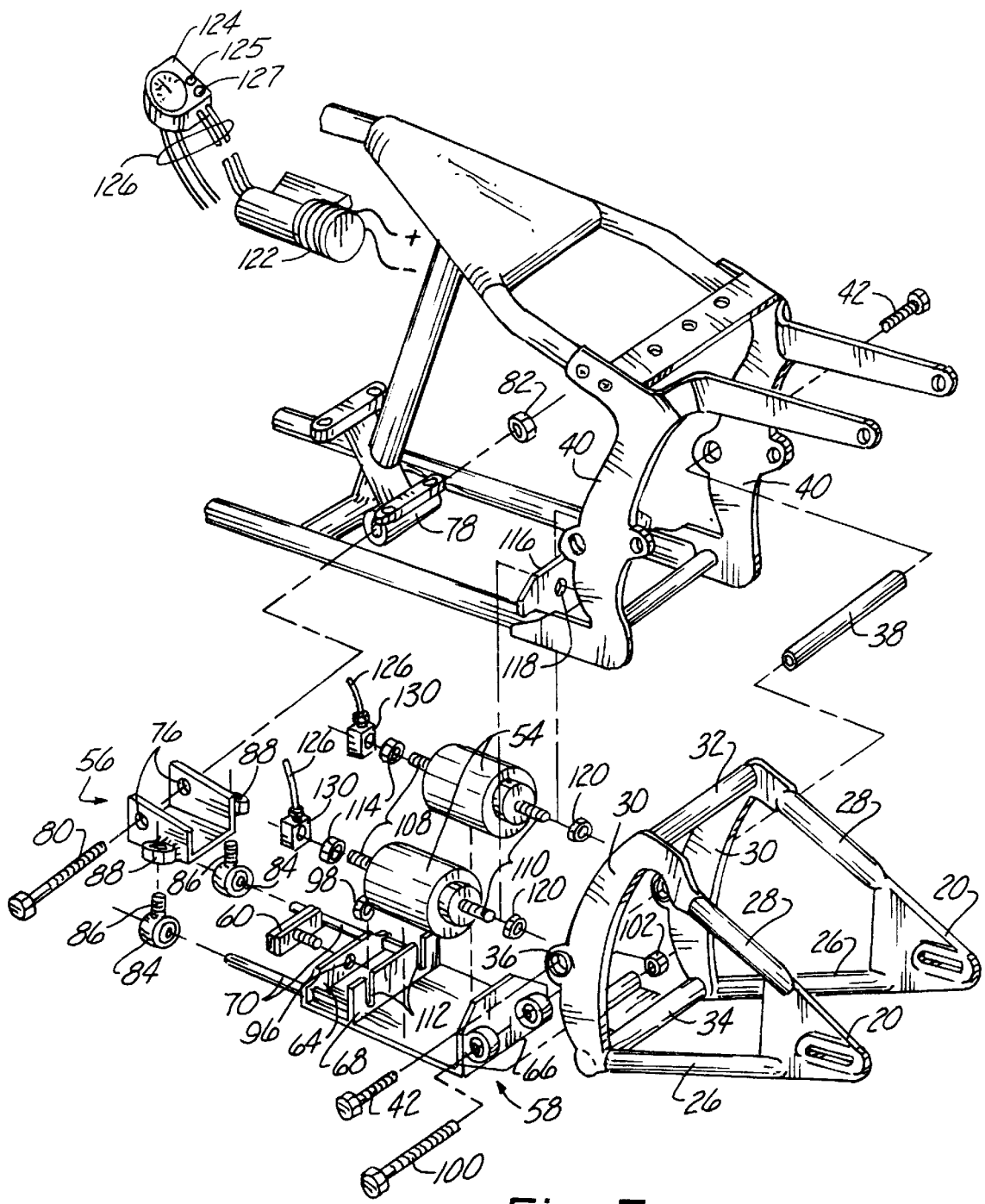
FIG. 7 is an exploded perspective view of the components comprising the air-bag suspension system of the present invention.

The resilient stop member (60) is disposed between the front plate (64) of the slidable housing (52) and the forward connection (56), and fits between the slide rods (70) (FIGS. 3 and 7). The resilient stop member (60) is comprised of a plate (90) (FIG. 5) having a threaded stud (92) fixed to one face. Fixed to the opposing face of the plate (90) is a resilient pad (94) preferably made of hard rubber or the like. The threaded stud (92) is received by an aperture (96) (FIG. 7) in the front plate (64) and is secured thereto by a nut (98). The resilient stop member (60) acts as a stop to prevent the front plate (64) of the slidable housing (52) from coming into contact with the forward connection (56) as the slidable housing (52) moves forwardly. The movement of the slidable housing (52) is discussed in detail below, and the purpose of the stop member (60) will then be appreciated.

Figure 6:
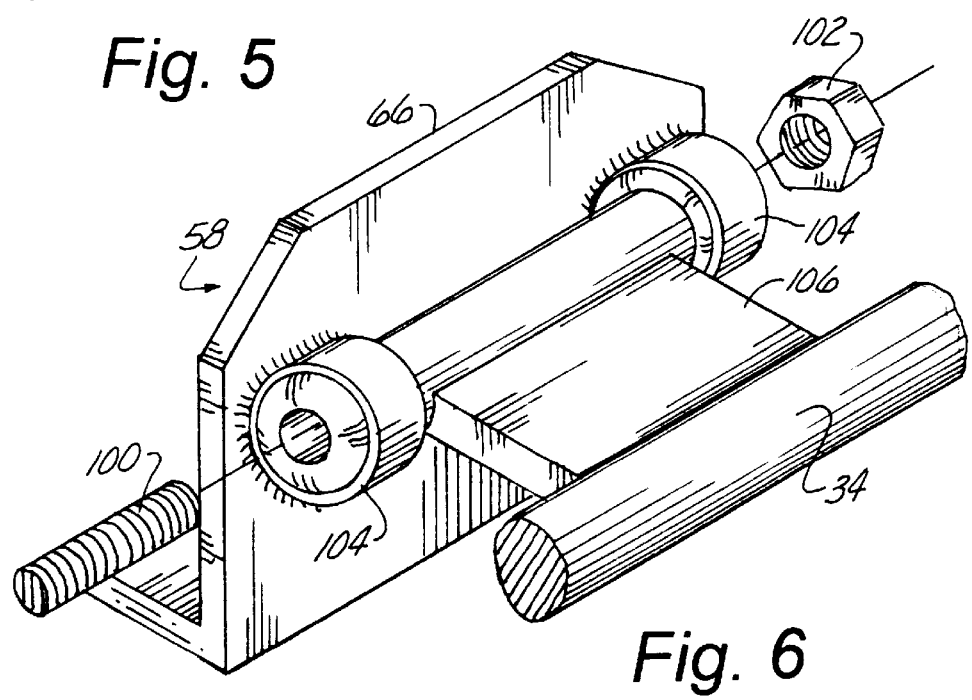
FIG. 6 is a detailed perspective view of the rear connection of the air-bag suspension unit of the present invention.

The rearward connection (58) is connected to the swing arm (16) by a third threaded bolt (100) and nut (102) (FIG. 6 and FIG. 7). The rearward connection (58) is comprised of a second pair of bushings (104) connected to the rear plate (66) of the slidable housing (52). The second pair of bushings (104) are spaced apart to receive a swing arm mount (106) projecting from the lower transverse cross member (34) of the swing arm (16). The swing arm mount (106) is adapted to receive the third threaded bolt (100) and to fit between the spaced apart pair of second bushings (104). The third threaded bolt (100) extends through the bushings (104) and swing arm mount (106) and threadably engages the nut (102), thereby pivotally securing the air-bag housing (52) to the swing arm (16).

Disposed within the housing (52) between the intermediate plate (68) and the rear plate (66) are preferably two air bags (54) constructed out of an elastomeric material. The air bags (54) and the slidable housing (52) take the place of the shock absorbers in the standard or stock SOFTAIL® suspension system. The two air bags (52) are of the type manufactured by Firestone, (model number 1M1A1, or an equivalent thereof), having threaded nipples (108) at their forward ends and threaded connectors (110) at their rearward ends (FIG. 7). The air bags are designed for a gauge pressure between 0 psi and 115 psi minimum. Slots (112) (FIG. 3 and 7) in the intermediate plate (68) receive the threaded nipples (108) projecting from the forward end of the air bags (54). A nut (114) secures the forward ends of the air bags (54) to the intermediate plate (68). The rearward ends of the air bags (54) are secured to a mounting bracket (116) (FIGS. 2 and 7) on the motorcycle main frame (14). When the air bag suspension unit (50) is in the proper mounting position, the mounting bracket (116) will be disposed between the intermediate plate (68) and the rear plate (66) as illustrated in FIG. 3. The air bags (54) fit between the intermediate plate (68) and the mounting brackets (116). The mounting brackets (116) include apertures (118) (FIGS. 2 and 7) adapted to receive the threaded connectors (110) at the rearward ends of the air bags (54). Nuts (120) (FIG. 7) threadably engage the connectors (110) thereby securing the rearward ends of the air bags (54) to the mounting brackets (116) on the motorcycle main frame (14).

In the preferred embodiment, the air bags (54) are connected to a small air compressor (122) (FIGS. 8 and 9) by air lines (126). A gauge (124) operably connected to the air lines enables the rider to see the amount of pressure in the system. The pressure gauge (124) and compressor (122) may be mounted on brackets projecting from the frame (14). It is desirable to place the gauge (124) in a position where it will be visible to the rider, and easily accessible, for example, near the gas tank, speedometer, tachometer, etc. Two buttons (125, 127) are located near the gauge (124). The first button (125), acts to engage a dump valve for deflating the air bags (54). The second button (127) engages the compressor to inflate the air bags (54). The compressor (122) and control buttons (125 and 127) are connected through the motorcycles electrical system which receives electrical current from the motorcycle battery (128). The air lines (126) run between the air compressor (122) and gauge (124) and are connected to the threaded nipples (108) at the forward end of the air bags (54) by a fitting (130) (FIG. 7).

Figure 10:
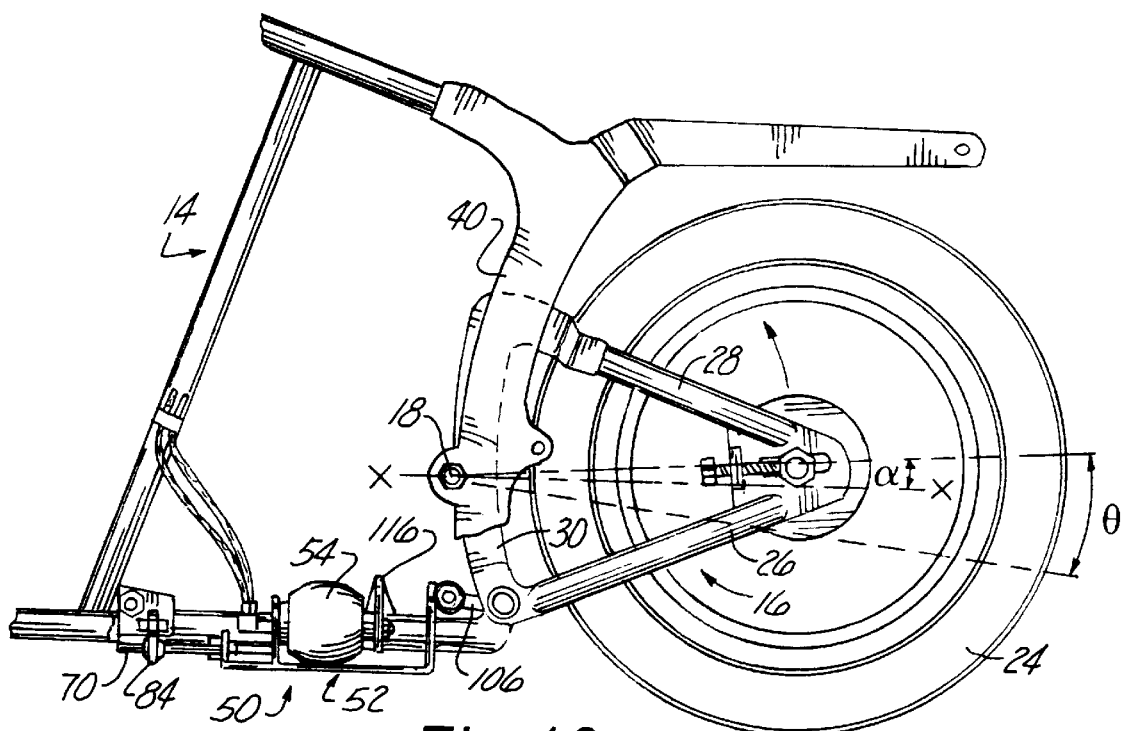
FIGS. 10 and 11 are elevation views of the rear portion of a motorcycle showing the pivoting action of the swing arm and deflection of the air bags.
Figure 11:
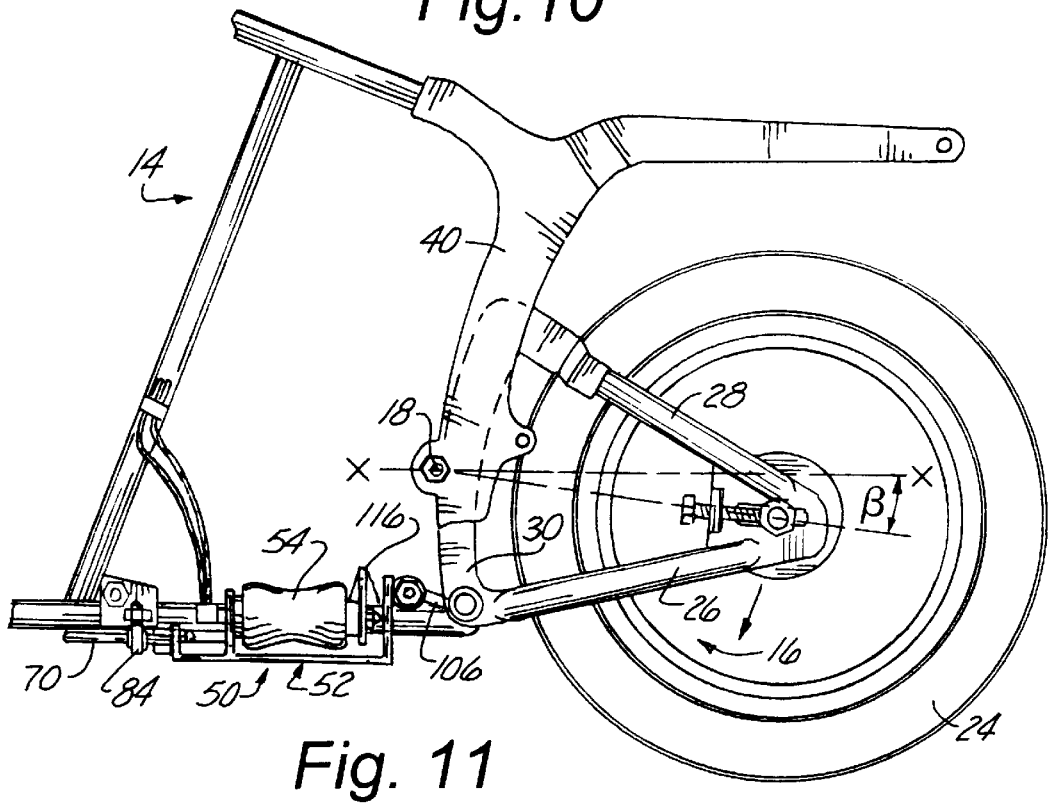

FIGS. 10 and 11 illustrate the air bag suspension system (10) of the present invention in operation. It should be understood that the swing arm (16) operably connects the rear wheel (24) to the motorcycle main frame (14) at the pivot axis (18). With the rear wheel (24) pivotally connected to the motorcycle main frame (14), the rear wheel (24) is free to arcuately move independently of the frame about the pivot axis (18) through an angle Θ (FIG. 10). As the rear wheel (24) arcuately moves through the angle Θ the air bag (54) is caused to compress (FIG. 10) or stretch (FIG. 11) thus dampening the effect of the action of the wheel (24) much like the shock absorbers in the stock SOFTAIL® suspension system, only more effectively.

The use of air bags (54) has several advantages over the shock absorbers. For example, the air pressure in the air bags (54) can be adjusted while the motorcycle is on the move. If the air pressure within the air bag (54) is increased, the ride will be stiffer. If the air pressure within the air bag (54) is decreased, the ride will be softer. Also, the responsiveness of the air bags (54) to rapid changes in wheel direction is much better than the responsiveness of shock absorbers. As discussed previously, shock absorbers have inherent friction and drag problems which reduces the responsiveness of the piston and shaft within the shock absorber to rapid directional changes. Because the air bags (54) do not have a shaft and piston arrangement, there is no inherent drag or friction and therefor the responsiveness of the air bags to rapid directional changes is much quicker. Additionally, for appearance purposes, the air bag (54) can be fully inflated causing the rear of the motorcycle to set higher than the forward portion of the motorcycle. Alternatively, for the opposite appearance, the air in the air bags can be completely released thus lowering the rear of the motorcycle. The ability to vary the height of the rear end is desirable to many motorcycle enthusiasts particularly when displaying their motorcycles at rallies or bike shows.

In operation, if the rear wheel (24) is caused to move upwardly above an axis x—x (FIG. 10), the rearward end of the swing arm (16) will also move arcuately upwardly through an angle α. Because the swing arm (16) is pivotal about the pivot axis (18), the upward movement of the rearward end of the swing arm (16) will cause the forward end of the swing arm (16) to move arcuately downwardly. The downward and rearward movement of the lower transverse cross member (34) of the swing arm (16) will pull the air bag housing (52) rearwardly; the air bag housing (52) being pivotally connected at its rearward connection (58) to the lower transverse cross member (34) of the swing arm (16) by the swing arm mount (106). As the air bag housing (52) is drawn rearwardly, the slide rods (70) slide rearwardly through the bushings (84). The rearward movement of the air bag housing (52) relative to the stationary mounting bracket (116) on the motorcycle main frame (14) causes the air bag (54) therebetween to compress (FIG. 1 0) thus dampening the effect of the movement of the rear wheel (24).

If the rear wheel (24) is caused to move downwardly below an axis x—x (FIG. 11), the rearward end of the swing arm (16) will also move arcuately downwardly through an angle β. Because the swing arm (16) is pivotal about the pivot axis (18), the downward movement of the rearward end of the swing arm (16) will cause the forward end of the swing arm (16) to move arcuately upwardly. The upward and forward movement of the lower transverse cross member (34) of the swing arm (16) will push the air bag housing (52) forwardly. As the air bag housing (52) is pushed forwardly, the slide rods (70) slide forwardly through the bushings (84). The forward movement of the air bag housing (52) relative to the stationary mounting bracket (116) of the motorcycle main frame (14) causes the air bag (54) therebetween to stretch (FIG. 11) thus dampening the effect of the movement of the rear wheel (24).

It should be appreciated that the above described air bag suspension system (10) is extremely responsive thereby giving the rider a very smooth ride. It should also be appreciated however, that because of the extremely responsive nature of the air bags (58), the above described suspension system (10) is best suited for highway travel where the traveling surface is relatively smooth and also in situations where the rider wants to display his or her motorcycle at rallies and bike shows. It has been determined that if the motorcycle, using the above described air bag suspension system, is used on rough terrain, a slight modification of the above described suspension system (10) is preferred.

Figure 12:
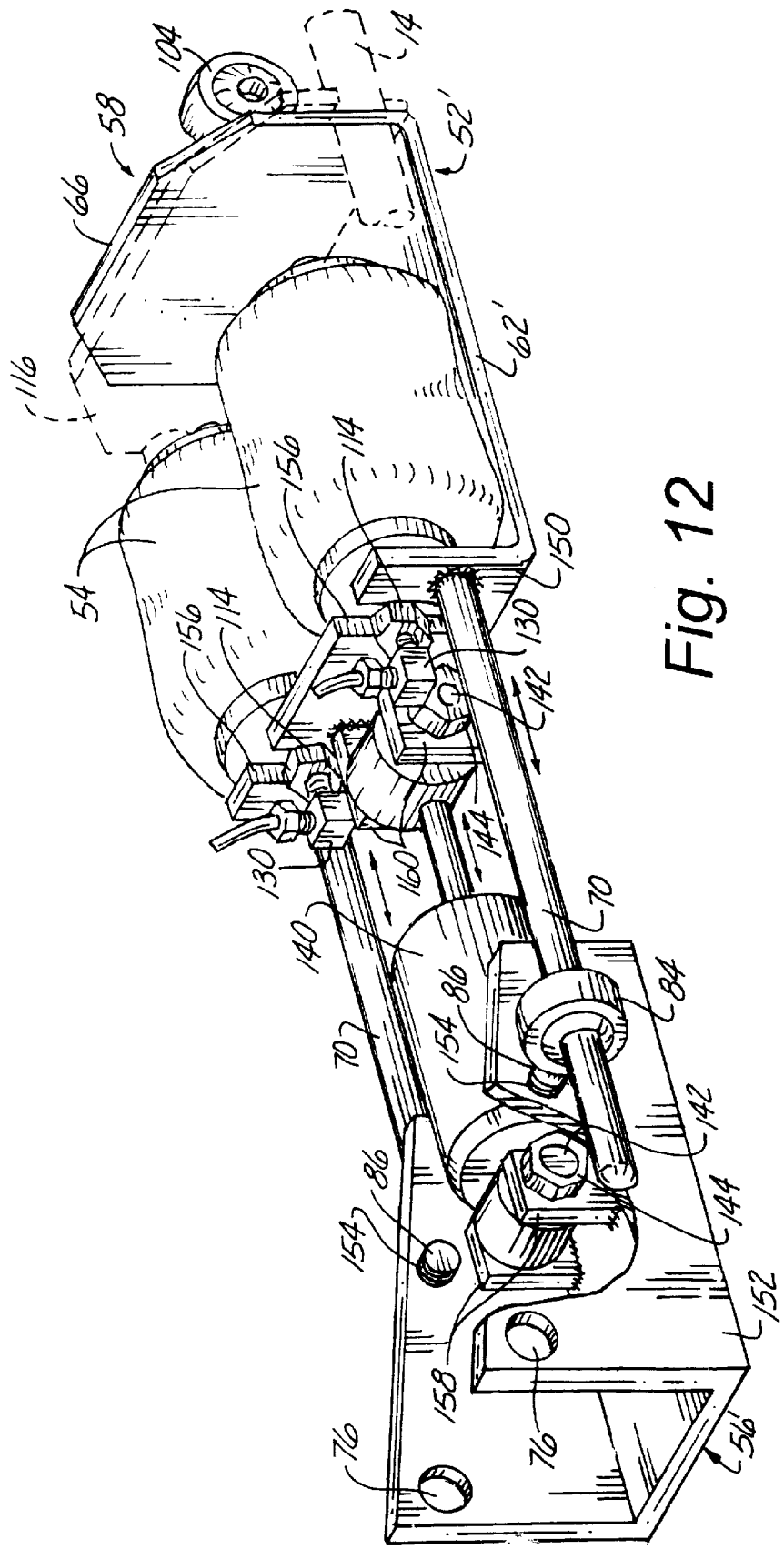
FIG. 12 is a perspective view of an alternative embodiment of the air bag suspension unit.

This alternative embodiment is shown in FIG. 12 and includes a modified air bag suspension unit (50'). In this embodiment, the air bag suspension unit (50') includes a slidable housing (52'), which preferably includes the same two air bags (54), a forward connection (56') slightly modified as compared to the first embodiment, the same rearward connection (58), and a shock absorber (140). The slidable housing (52') is comprised of a bottom plate (62'), to which is attached a front plate (150) and a rear plate (66). Attached to the front plate (150) are slide rods (70).

The forward connection (56') of the air bag suspension unit (50') is substantially the same as that described for the first embodiment. The forward connection (56') is comprised of a mounting bracket (152) having apertures (154) therein. The mounting bracket (152) is designed to receive a forward frame mount (78) (FIGS. 2 and 7) projecting from the motorcycle main frame (14). The forward frame mount (78) is adapted to receive a threaded bolt (80) which extends through the apertures (154) in the forward connection (56') and through the forward mount (78). A nut (82) secures the forward connection (56') to the motorcycle main frame (14).

As shown in FIG. 12, the forward connection (56') also includes a pair of bushings (84) which receive the slide rods (70). In this embodiment, the bushings (84) include a threaded connector (86) which threadably engages a second aperture (154) tapped to receiving the threads of the threaded connector (86).

The rearward connection (58) is the same as that of the first embodiment shown in FIG. 6. The rearward connection (58) is comprised of a pair of bushings (104) connected to the rear plate (66) of the slidable housing (52'). The pair of bushings (104) are spaced apart to receive the swing arm mount (106) projecting from the lower transverse cross member (34) of the swing arm (16). The swing arm mount (106) is adapted to receive the threaded bolt (100) and to fit between the spaced apart pair of second bushings (104). The threaded bolt (100) extends through the bushings (104) and swing arm mount (106) and threadably engages the nut (102), thereby pivotally securing the air-bag housing (52) to the swing arm (16).

Disposed within the housing (52') between the first plate (150) and the rear plate (66) are preferably two air bags (54) constructed out of an elastomeric material. The two air bags (52) are of the type manufactured by Firestone, (model number 1M1A1, or an equivalent thereof), having threaded nipples (108) at their forward ends and threaded connectors (110) at their rearward ends (FIG. 7). The air bags are designed for a gauge pressure between 0 psi and 115 psi minimum. Slots (156) (FIG. 12) in the front plate (150) receive the threaded nipples (108) projecting from the forward end of the air bags (54). A nut (114) secures the forward ends of the air bags (54) to the front plate (150). The rearward ends of the air bags (54) are secured to a mounting bracket (116) on the motorcycle main frame (14). When the air bag suspension unit (50') is in the proper mounting position, the mounting bracket (116) will be disposed between the front plate (150) and the rear plate (66) as illustrated in FIG. 12. The air bags (54) fit between the front plate (150) and the mounting brackets (116). The mounting brackets (116) include apertures (118) (FIGS. 2 and 7) adapted to receive the threaded connectors (110) at the rearward ends of the air bags (54). Nuts (120) (FIG. 7) threadably engage the connectors (110) thereby securing the rearward ends of the air bags (54) to the mounting brackets (116) on the motorcycle main frame (14).

The shock absorber (140) is disposed between the forward connection (56') and the front plate (150) of the slidable housing (52') and is pivotally attached at both ends thereto as illustrated in FIG. 12. It should be appreciated that the forward connection (56') includes a connecting bracket (158) and the front plate (150) includes a connecting bracket (160) adapted for receiving the respective mounting ends of the shock absorber (140). A threaded connector (142) and nut (144) pivotally connect the shock absorber (140) to the connecting brackets (158 and 160).

With this modified air bag suspension unit (50'), all the advantages and features outlined and described for the first embodiment are possible with the added feature of a conventional shock absorber to improve the handling of the motorcycle on rough or uneven terrain.

Obviously many modifications and variations of the present invention are possible in light of the above teachings. It is therefore to be understood that, within the scope of the appended claims, the invention may be practiced otherwise than as specifically described.

We claim:

1. A suspension system for a motorcycle, comprising:
 a motorcycle main frame;
 a swing arm pivotally mounted to said motorcycle main frame on a pivot axis; and an air-bag suspension unit connected to said swing arm and said motorcycle main frame;
 wherein said swing arm includes a pair of wheel mounts located on a wheel axes spaced to receive a wheel, a pair of arms extending from each of said wheel mounts, a connector connecting each said pair of arms, each connector being joined to the other connector by an upper transverse cross member and a lower transverse cross member, and an intermediate transverse cross member pivotally connecting said motorcycle main frame to said swing arm at said pivot axis;
 wherein said air-bag suspension unit includes at least one air bag constructed of elastomeric material; and
 wherein said air-bag suspension unit includes a slidable housing, a forward connection, and a rearward connection, said forward connection mounted to said motorcycle main frame and said rearward connection mounted to said lower transverse cross member of said swing arm, said air bag being connected at one end to said slidable housing and at another end to said motorcycle main frame.

2. The suspension system of claim 1 wherein the air pressure in said air-bag is adjustable.

3. The suspension system of claim 1 including a compressor for inflating said air bag.

4. The suspension system of claim 3 including a device for adjusting the air pressure in said air bag.

5. The suspension system of claim 4 wherein the air pressure in said air bag is adjustable while the motorcycle is being operated.

6. The suspension system of claim 1 wherein said air bag suspension unit includes a shock absorber operably pivotally connected at one end to said forward connection and at another end to said slidable housing.

7. The suspension system of claim 6 including a compressor for inflating said air bag.

8. The suspension system of claim 6 including a device for adjusting the air pressure in said air bag.

9. The suspension system of claim 8 wherein the air pressure in said air bag is adjustable while the motorcycle is being operated.

10. The suspension system for a motorcycle of claim 1, further comprising:
 said air-bag suspension unit being adjustable.

11. The suspension system of claim 10 including a compressor operably attached to said frame for selectively inflating said adjustable air suspension system.

12. The suspension system of claim 11 including a device operably attached to said air suspension system for adjusting the air pressure in said adjustable air suspension system.

13. A suspension system for a motorcycle, comprising:
 a motorcycle main frame;
 a swing arm pivotally mounted to said motorcycle main frame on a pivot axis; and an air-bag suspension unit connected to said swing arm and said motorcycle main frame;
 wherein said air-bag suspension unit includes at least one air bag constructed of elastomeric material; and
 wherein said air-bag suspension unit includes a slidable housing, a forward connection, and a rearward connection, said forward connection mounted to said motorcycle main frame and said rearward connection mounted to a lower transverse cross member of said swing arm, said air bag being connected at one end to said slidable housing and at another end to said motorcycle main frame.

14. The suspension system of claim 13 wherein the air pressure in said air-bag is adjustable.

15. The suspension system of claim 13 including a compressor for inflating said air-bag.

16. The suspension system of claim 15 including a device For adjusting the air pressure in said air-bag.

17. The suspension system of claim 16 wherein the air pressure in said air-bag is adjustable while the motorcycle is being operated.

18. The suspension system of claim 19 wherein said air-bag suspension unit includes a shock absorber operably pivotally connected at one end to said forward connection and at another end to said slidable housing.

19. The suspension system of claim 18 including a compressor for inflating said air-bag.

20. The suspension system of claim 18 including a device for adjusting the air pressure in said air-bag, wherein the air pressure in said air-bag is adjustable while the motorcycle is being operated.

* * * * *